Figures 1, 2:
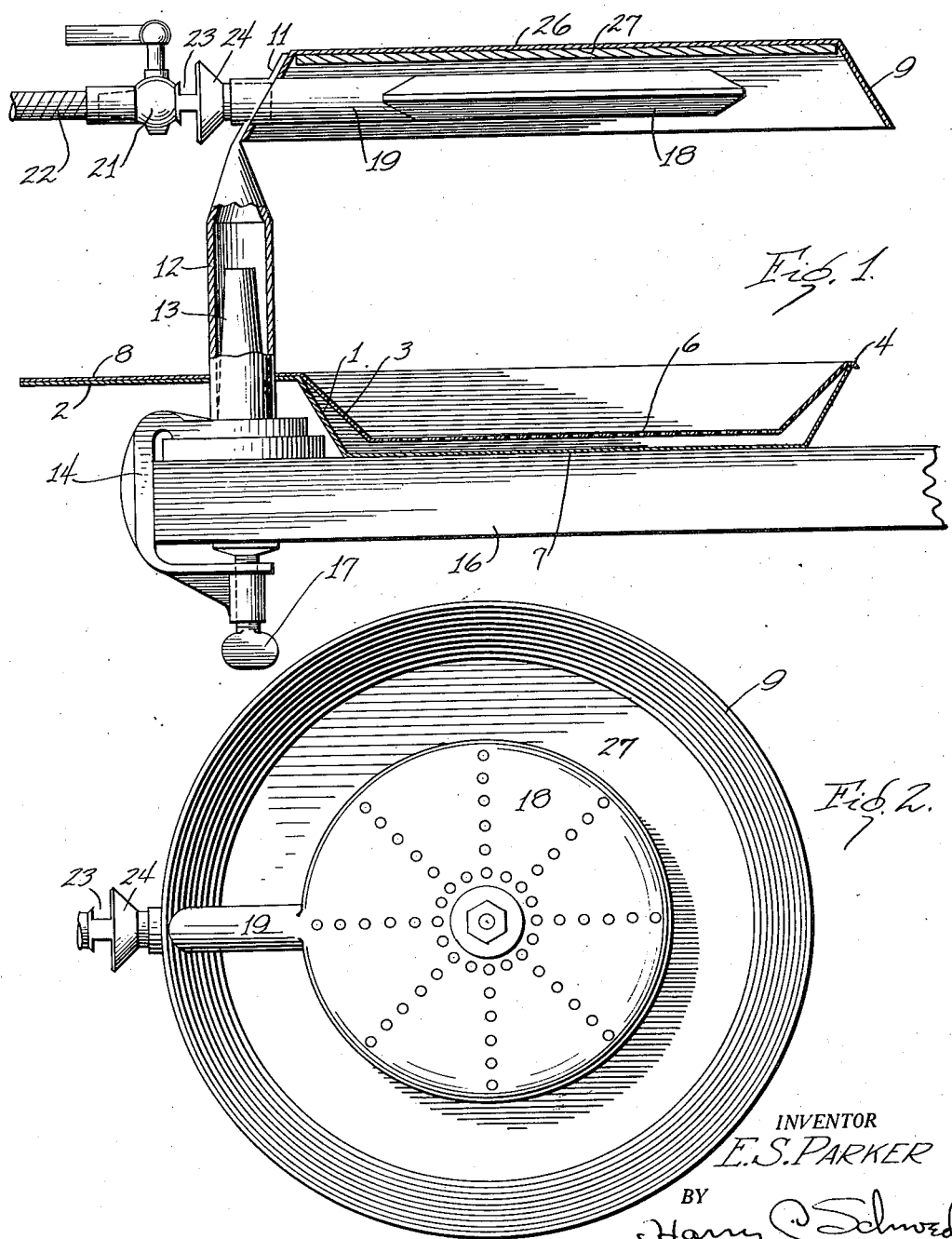

June 4, 1929.  E. S. PARKER  1,715,617
BROILER
Filed Sept. 13, 1926

INVENTOR
E. S. PARKER
BY
Harry C. Schwede
ATTORNEY

Patented June 4, 1929.

1,715,617

UNITED STATES PATENT OFFICE.

EARL S. PARKER, OF LOS ANGELES, CALIFORNIA.

BROILER.

Application filed September 13, 1926. Serial No. 135,056.

The present invention relates to improvements in broiler and has particular reference to a portable broiler which may be fastened to any suitable support and particularly to the edge of a gas stove or the like. It is the object of the present invention to provide by simple means an economical broiler that may be connected to any gas connection and is ready for instant use. Further objects and advantages of my invention will appear as the specification proceeds.

The preferred form of my invention is illustrated in the accompanying drawing in which—

Figure 1 shows a vertical section thru my device set up for immediate use and,

Figure 2 a bottom plan view of a burner used in my broiler and its supporting arrangement.

While I have shown only the preferred form of the invention, I wish to have it understood that various changes or modifications may be made within the scope of the claims hereto attached without departing from the spirit of the invention.

In its preferred form, my invention comprises a receptacle in which the object to be broiled, such as a steak, is placed and an inverted burner placed above the same and supported in spaced relation thereto. The receptacle which accommodates the object to be broiled may be of many different forms and is here shown as a pan 1 of ordinary construction having a handle 2 extending therefrom and a second pan 3 with a perforated bottom and perforated sides adapted to rest on the rim of the first pan as shown at 4 and dimensioned so that its bottom 6 is slightly spaced from the bottom 7 of the pan. The perforated pan has a handle 8 extending therefrom, which latter coincides in length with the handle 2 and is preferably embedded therein when the two handles are made to register.

To support a burner above the pan, I provide an inverted pan 9 which has a strap 11 fastened to the outer face of its rim and has a tubular post 12 extending downwardly from said strap, the said tubular post being adapted for telescoping engagement with a solid post 13 rising from a clamp 14 adapted to be fastened to the edge 16 of a supporting element by means of the screw 17 in a manner well known in the art. The inverted pan 9 has an inverted burner 18 of any suitable make supported therein, the burner being supported by the gas pipe 19 extending thru the rim of the pan 9 and the strap 11 fixed to the rim. The pipe 19 is provided at its outer end with a valve 21 connecting thru the flexible tube 22 with any suitable gas connection. Air is admitted into the gas thru openings 23 in the fitting 24 in the customary manner. The burner 18 is preferably separated from the bottom 26 of the pan 9 by means of a sheet 27 of asbestos.

The manner of using my device will be readily understood from the foregoing description. The clamp 14 may be clamped upon any suitable edge available and the post 12 of the upper inverted pan may be telescoped on the post 13. After connections have been established with a gas supply, the device is ready for use. The steak to be broiled is placed on the pan 3 and the two lower pans are placed below the burner. When the burner is lit, the flame emanating from the burner is directed at the meat and heat waves escaping are reflected by the upper pan.

It will be noted that the burner with its supporting pan may be revolved around the supporting post 13 which facilitates the handling of the same.

I do not desire to limit myself to the exact arrangement or construction of parts, shown in the accompanying drawing and described in this specification. For example, I contemplate applying either gas or electricity as a heating means and only in so far as I have particularly pointed out my invention and limit myself to the same in the appended claims do I desire to be limited.

I claim:

1. In a broiler of the character described, an inverted pan having a strap fastened to the rim thereof and a post extending downwardly from the strap and an inverted burner supported within the pan having a feed pipe extending through the rim of the pan and the strap.

2. A broiler comprising a pan, a second pan having a perforated bottom supported above the bottom of said first named pan, a clamp adapted for fastening to the edge of a board having a post rising therefrom, an inverted pan having a hollow post for receiving said first named post and being rotatably supported by said clamp, an insulating pad disposed in the inverted pan, and a burner disposed in the inverted pan.

3. A device of the character described comprising a supporting clamp, a vertical post carried by the clamp, a tubular member surrounding the post and adapted to have pivotal relation thereto, the tubular member terminating in a strap, a hood secured to the strap, a heating element supported by the hood, a fuel pipe extending through the rim of the hood and the strap, a pan below and spaced from the heating element and a perforated pan within and spaced from the first-named pan.

In testimony whereof I do hereby affix my signature.

EARL S. PARKER.